United States Patent
Asano et al.

(10) Patent No.: US 6,728,022 B2
(45) Date of Patent: Apr. 27, 2004

(54) ELECTROCHROMIC DEVICE

(75) Inventors: Tsuyoshi Asano, Yokohama (JP); Shinji Ohshima, Yokohama (JP); Yoshinori Nishikitani, Yokohama (JP)

(73) Assignee: Nippon Oil Corporation, Tokyo (JP)

( * ) Notice: Subject to any disclaimer, the term of this patent is extended or adjusted under 35 U.S.C. 154(b) by 0 days.

(21) Appl. No.: 10/205,982

(22) Filed: Jul. 26, 2002

(65) Prior Publication Data

US 2003/0072071 A1 Apr. 17, 2003

Related U.S. Application Data

(63) Continuation of application No. PCT/JP01/00455, filed on Jan. 24, 2001.

(30) Foreign Application Priority Data

Jan. 26, 2000 (JP) ........................................ 2000-016929

(51) Int. Cl.[7] .............................. G02F 1/15; G02F 1/153
(52) U.S. Cl. ....................... 359/265; 359/273; 359/275
(58) Field of Search ................................. 359/238, 265, 359/273, 274, 275

(56) References Cited

U.S. PATENT DOCUMENTS

| 5,883,220 A | 3/1999 | Armand et al. .............. 528/322 |
| 5,910,854 A | 6/1999 | Varaprasad et al. ......... 359/273 |
| 2003/0087107 A1 * | 5/2003 | Varaprasad et al. ......... 428/432 |

FOREIGN PATENT DOCUMENTS

| EP | 0 612 826 A1 | 8/1994 |
| JP | 63-24225 A | 2/1988 |
| JP | 7-70218 A | 3/1995 |
| JP | 8-503979 A | 4/1996 |
| JP | 11-183941 A | 7/1999 |

* cited by examiner

*Primary Examiner*—Georgia Epps
*Assistant Examiner*—Tim Thompson
(74) *Attorney, Agent, or Firm*—Akin Gump Strauss Hauer & Feld LLP

(57) ABSTRACT

An electrochromic device comprises an ion conductive layer containing an electrochromic polymer that has a bipyridine ion pair structure and a metallocene structure and/or a dihydroxyphenaizine structure. The device has low leakage current and reduced remnant coloration after a long time use.

2 Claims, 1 Drawing Sheet

ELECTROCHROMIC DEVICE

CROSS-REFERENCE TO RELATED APPLICATION

This application is a continuation of International Patent Application No. PCT/JP01/00455, filed Jan. 24, 2001, and the disclosure of which is incorporated herein by reference.

BACKGROUND OF THE INVENTION

1. Field of the Invention

This invention relates to electrochromic devices which are useful as transmission-type devices such as smart windows, reflection-type devices such as antiglare mirrors for automobiles and decorative mirrors, and displays.

2. Description of Related Art

A method of forming a chromogenic layer for an electrochromic device hereinafter referred to as an EC device such as smart windows is known from Japanese Laid-Open Patent Publication No. 63-18336 disclosing a method in which a film of chromogenic layer is formed by vacuum-evaporating an electrochromic active substance such as tungsten oxide ($WO_3$) over a transparent electrically conductive film.

However, this method requires techniques carried out under vacuum conditions, which lead to elevated production costs and the requirement of a large-sized vacuum apparatus for the production of an EC device with a large-surface area.

There have been reported various EC devices containing an organic electrochromic compound such as viologen derivatives in the ion conductive layer as disclosed in Japanese Patent Laid-Open Publication Nos. 9-120088 and 7-702118. However, these EC devices have large leakage current and must be electrified all the time to maintain the coloration state. Furthermore, a long time coloration causes a problem that remnant coloration occurs even after decoloration. The present invention was made in view of such situations and intended to provide an EC device which is less in leakage current and can reduce the remnant coloration caused by long time coloration.

BRIEF SUMMARY OF THE INVENTION

After extensive research and study for solving the foregoing problems, it was found that the problems could be solved with an EC device having an ion conductive layer containing an electrochromic polymer as described below.

That is, the EC device according to the present invention wherein an ion conductive layer is provided between a pair of electrically conductive substrates at least one of which is transparent is characterized in that the ion conductive layer contains an electrochromic polymer which is a reaction product of a polymer having reactive groups with the following organic compound.

The organic compound is an organic compound having both a structure exhibiting cathodic electrochromic properties and a structure exhibiting anodic electrochromic properties and further functional groups reactive with the reactive groups of the polymer.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
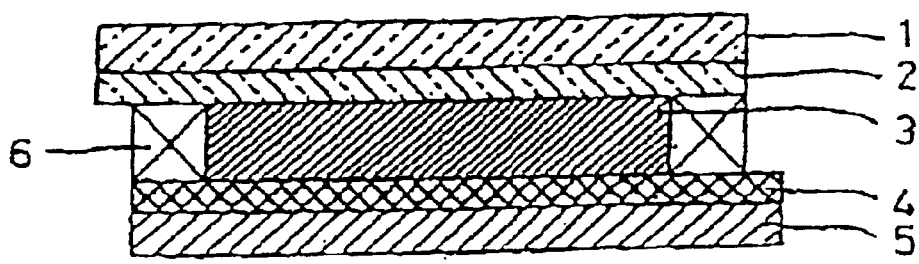
FIG. 1 is a cross-sectional view showing one example of the structure of an electrochromic device of the present invention.

The invention provides an electrochromic (EC) device comprising two electrically conductive substrates, wherein the term "electrically conductive substrates" means that the substrates function as electrodes. Therefore, the electrically conductive substrates encompass those made from electrically conductive materials and those obtained by laminating an electrically conductive layer over one or both surfaces of an non-electrically conductive substrate. Regardless of whether the substrates are electrically conductive, the substrates preferably have a smooth surface at normal temperatures. However, the surface may be flat or curved as well as deformable under stress.

At least one of the pair of electrically conductive substrates is transparent and the other may be transparent or opaque or may be a reflective electrically conductive substrate which is capable of reflecting light.

Generally, a device having electrically conductive substrates both of which are transparent is suitable for displays and smart windows, while a device having an electrically conductive transparent substrate and an opaque one is suitable for displays. A device having a transparent electrically conductive substrate and a reflective one is suitable for electrochromic mirrors.

The transparent electrically conductive substrate may be produced by laminating a transparent electrode layer over a transparent substrate. The term "transparent" used herein denotes an optical transmission ranging from 10 to 100 percent.

No particular limitation is imposed on the material of the transparent substrate, which, therefore, may be color or colorless glasses, tempered glasses or color or colorless transparent resins. Specific examples of such resins are polyethylene terephtalate, polyethylene naphthalate, polyamide, polysulfone, polyether sulfone, polyether etherketone, polyphenylene sulfide, polycarbonate, polyimide, polymethyl methacrylate, and polystyrene.

The transparent electrode layer may be made of a metal thin film of gold, silver, chrome, copper, and tungsten or an electrically conductive thin film of metal oxides. Specific examples of the metal oxides are ITO ($In_2O_3$—$SnO_2$), tin oxide, silver oxide, zinc oxide, and vanadium oxide. The film thickness is usually within the range of 10 to 500 nm and preferably 50 to 300 nm. The surface resistance of the film is within the range of usually 0.5 to 500 Ω/sq. and preferably 1 to 50 Ω/sq. Any suitable method of forming a transparent electrode layer may be employed depending on the type of metals and/or metal oxides forming the electrode. The transparent electrode layer may be formed by vacuum evaporation, ion-plating, sputtering, and sol-gel methods.

For the purpose of imparting oxidation-reduction capability and electric double layer capacitance and improving electric conductivity, an opaque electrode activator may be partially applied to the surface of the transparent electrode layer. The electrode activator may be a metal such as copper, silver, gold, platinum, iron, tungsten, titanium and lithium, an organic material having oxidation-reduction capability, such as polyaniline, polythiophen, polypyrrole, and phthalocyanine, a carbon material such as active carbon and graphite, a metal oxide such as $V_2O_5$, $MnO_2$, NiO, and $Ir_2O_3$, and a mixture thereof.

Upon the formation of the electrode activator over a transparent electrode layer, it is necessary not to harm the transparency thereof excessively. Therefore, the opaque electrode activator may be applied onto an electrode by forming thin stripes or dots of a composition comprising an active carbon fiber, graphite, and an acrylic resin over a transparent ITO layer or forming mesh of a composition comprising $V_2O_5$, acetylene black, and butyl rubber over a gold thin film.

The opaque electrically conductive substrate may be produced by substituting the transparent substrate of the above-described transparent electrically conductive substrate with an opaque substrate such as various plastics, glasses, woods, and stones if the substrate need not be transparent.

Eligible reflective electrically conductive substrates for the present invention are (1) laminates obtained by laminating a reflective electrode layer over a non-electrically conductive transparent or opaque substrate, (2) laminates obtained by laminating a transparent electrode layer over one surface of a non-electrically conductive transparent substrate and a reflective layer over the other surface thereof, (3) laminates obtained by laminating a reflective layer over a non-electrically conductive transparent substrate and a transparent electrode layer over the reflective layer, (4) laminates obtained by laminating a transparent electrode layer over a reflective plate used as a substrate, and (5) plate-like substrates which themselves have functions as a photo-reflective layer and an electrode layer.

The term "reflective electrode layer" denotes a thin film which has a mirror surface and is electrochemically stable in performance as an electrode. Specific examples of such a thin film are a metal film of gold, platinum, tungsten, tantalum, rhenium, osmium, iridium, silver, nickel or palladium and an alloy film of platinum-palladium, platinum-rhodium or stainless. Any suitable method of forming such a thin film may be employed such as vacuum evaporation, ion-plating, and sputtering methods.

The substrate to be provided with a reflective electrode layer may be transparent or opaque. Therefore, the substrate may be the above-described transparent substrate and various plastics, glasses, woods and stones which may not be transparent.

The term "reflective plate" or "reflective layer" denotes a substrate having a mirror surface or a thin film which may be a plate of silver, chrome, aluminum, stainless, nickel-chrome or a thin film thereof.

If the above described reflective electrode layer per se is rigid, a substrate may not be needed.

The EC device of the present invention contains an electrochromic polymer (hereinafter referred to as EC polymer) which is an reaction product of a polymer having in its side chain reaction groups (hereinafter referred to as Polymer A) with an organic compound having functional groups reactive with the reactive groups of Polymer (A) and both a structure exhibiting cathodic electrochromic properties and a structure exhibiting anodic electrochromic properties (hereinafter referred to as Compound (A)), in the ion conductive layer.

Since the EC polymer has both a structure exhibiting cathodic electrochromic properties and a structure exhibiting anodic electrochromic properties the combination of which is hereinafter referred to as "electrochromic active unit", derived from Compound A, the EC polymer functions as an electrochromic active material. No particular limitation is imposed on the concentration of the electrochromic active unit in the ion conductive layer. However, the lower limit of the concentration is 1 mM or greater, preferably 5 mM or greater, and more preferably 10 mM or greater, while the upper limit of the concentration is 200 mM or less, preferably 100 mM or less, and more preferably 50 mM or less.

Examples of Polymer (A) to be used for producing the EC polymer are those whose main chain is formed by a poly (metha)crylate, a polyester, a polyether, or a polyurethane and whose side chain is formed by reactive groups such as hydroxyl, isocyanate, epoxy, glycidyl, carboxyl, amino, and thiol groups. No particular limitation is imposed on the molecular weight of Polymer (A). However, the molecular weight expressed by polystyrene calibration curve is within the range of usually 1,000 to 500,000 and preferably 3,000 to 200,000.

One examples of Polymer (A) may be represented by the following formulae:

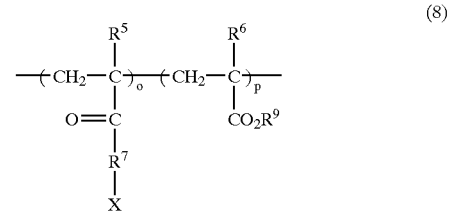

(8)

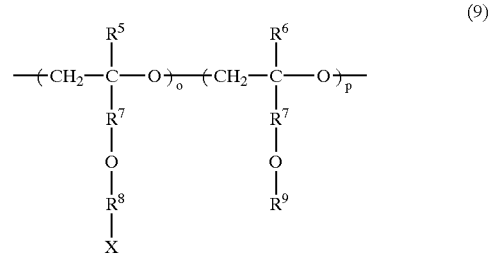

(9)

wherein $R^5$, $R^6$, and $R^9$ may be the same or different and each are an alkyl group having 1 to 10 carbon atoms, $R^7$ and $R^8$ may be the same or different and each are an organic group selected from alkylene, polyethylene oxide groups, and arylene groups having 1 to 10 carbon atoms, X is a functional group selected from hydroxyl, isocyanate, epoxy, glycidyl, carboxyl, amino, and thiol groups, o is an integer of $0 \leq o \leq 5,000$, p is an integer of $0 \leq p\ 5,000$, and $2 \leq o+p \leq 10,000$ and preferably $5 \leq o+p \leq 5,000$.

Polymers (A) represented by formula (8) or (9) may be synthesized by polymerizing or copolymerizing a monomer having in the side chain reactive groups such as hydroxyl, isocyanate, epoxy, glycidyl, carboxyl, amino, and thiol groups or polymerizing or copolymerizing a monomer having in the side chain no reactive group and introducing reactive groups to the resulting polymer.

One example of the monomer having in the side chain reactive groups are those represented by formulae (10) and (11):

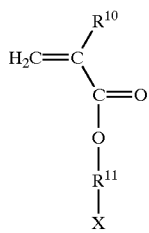

(10)

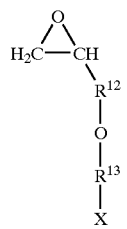

(11)

wherein $R^{10}$ is hydrogen or an alkyl group having 1 to 10 carbon atoms, $R^{11}$, $R^{12}$, and $R^{13}$ may be the same or different and each are an organic group selected from alkylene, polyethylene oxide, and arylene groups having 1 to 10 carbon atoms, and X is a functional group selected from hydroxyl, isocyanate, glycidyl, carboxyl, amino, and thiol groups.

Specific examples of the monomer represented by formulae (10) and (11) are as follows:

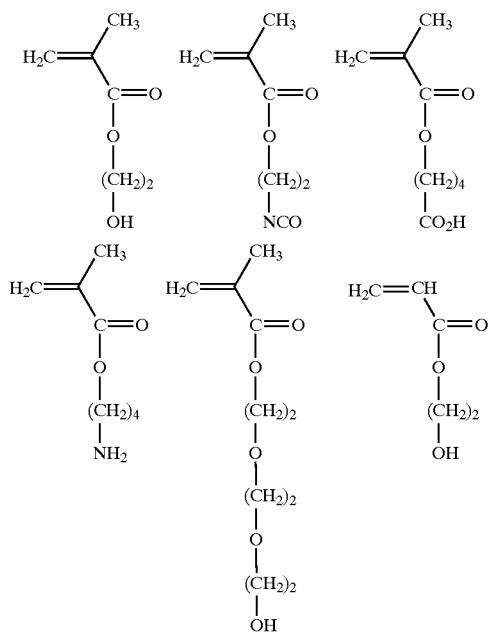

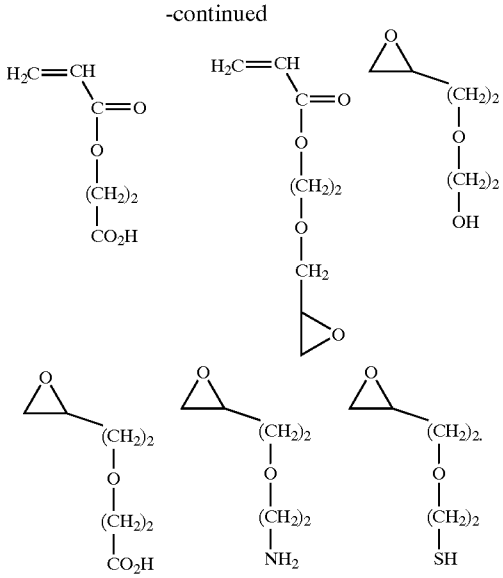

Among the above-exemplified reactive monomers, preferred for the present invention are hydroxyethyl (metha) acrylate, hydroxybutyl(metha)acrylate, diethylene glycol (metha)acrylate, tetraethylene glycol (metha)acrylate, 2-isocyanateethyl(metha)acrylate, (metha)acrylic acid, and glycidyl(metha)acrylate.

Polymers (A) used for the present invention may be synthesized by polymerizing or copolymerizing a reactive monomer represented by formula (8) or (9). In the case of copolymerizing such a monomer, a normal monomer having no reactive group may be used in combination. Examples of such a monomer are methacrylic acid esters such as methylmethacrylate, butylmethacrylate, cyclohexylmethacrylate, methoxydiethylene glycol methacrylate, and methoxytetraethylene glycol methacrylate; acrylic acid esters such as methylacrylate, butylacrylate, cyclohexylacrylate, methoxydiethylene glycol acrylate, and methoxytetraethylene glycol acrylate; styrene and styrene derivatives such as p-methylstyrene; vinyl esters such as vinyl acetate and methoxydiethylene glycol vinyl ester; glycidyl ethers such as methylglycidyl ether and methoxydiethylene glycol glycidyl ether; and glycidyl esters such as glycidyl acetate and glycidyl propionate.

When the reactive monomer is polymerized or copolymerized, any suitable method may be employed depending on the type of the monomer. For example, a polymerization method commonly used for the production of acrylic polymers can be employed for a radical polymeric monomer such as methacrylate. That is, Polymer (A) can be obtained by dissolving a polymerization initiator in a monomer mixture or a solution thereof and adding dropwise the solution in a warmed polymerization solvent to be reacted. Eligible polymerization initiators are azobisisobutylonitrile, 2,2'-dimethylazobisisobutylonitrile, and benzoyl peroxide. Eligible solvents are alcohols, ethers, ketones, and esters and more specifically are diglyme, propylene glycol monoacetate, propylene glycol monoacetate monomethyl ether, methoxybutanol, methylcellosolve, butylcellosolve, methylethylketone, methylisobutylketone, diethylene glycol monophenylehter, γ-butyrolactone, and propylene carbonate. These solvents may be mixed.

Generally, the reaction is conducted by adding dropwise a monomer solution containing a polymerization initiator into a reactor containing a part or whole of the solvent and adjusted to a predetermined temperature. The total amount of the solvent is adjusted such that the monomer concentration upon completion of the dropwise-addition is made to from 5 to 50 percent by mass, preferably from 10 to 40 percent by mass, and more preferably from 15 to 30 percent by mass. A too low concentration would cause a problem that it becomes difficult to isolate the polymer, while a too high concentration would cause a problem that the reaction solution is gelatinized, resulting form the difficulty of controlling the polymerization reaction.

The amount of the polymerization initiator to be used is adjusted within the range of from 0.5 to 10 percent by mass and preferably 1 to 5 percent by mass, based on the monomer. The polymerization initiator of too less amount would cause the polymerization reaction to be slow, while polymerization initiator of too much amount would cause too small molecular weight.

The reaction is carried out at a temperature of between 40° C. or higher and 120° C. or below, preferably 45° C. or higher and 110° C. or below, and more preferably 50° C. or higher and 100° C. or below. A too low reaction temperature causes the delayed reaction, while a too high temperature cause a problem that the reaction solution is gelatinized, resulting form the difficulty of controlling the polymerization reaction. The reaction time is within from 15 minutes to 20 hours, preferably from 30 minutes to 10 hours, and more preferably one hour to 5 hours. A too short reaction time would cause an incomplete polymerization, leading to the increase of the remaining unreacted monomer, while a too long reaction time would decrease the productivity.

In place of the above-described method, the polymerization may be conducted by dissolving a monomer and a polymerization initiator in a solvent and thereafter passing the solution through a reaction coil so as to heat the solution at a predetermined temperature for a predetermined time. The type and amount of the initiator and the solvent and the reaction time and temperature are the same as those for the above-described dropwise addition method.

After completion of the reaction, Polymer (A) is isolated by vacuum-distilling the solvent or separating the polymer precipitated by being added dropwise in a solvent such as hexane which has low solubility of the polymer. Alternatively, in the case of using a solvent such as γ-butyrolactone and propylene carbonate which are solvents having a large dielectric constant and usually used as an electrolyte of an EC device, there is no particular need to isolate the polymer which, therefore, can be brought into a reaction with Compound (A) described below, as it is.

Compound (A) to be reacted with the above-described Polymer (A) for obtaining the EC polymer for the present invention is an organic compound having both a structure exhibiting cathodic electrochromic properties and a structure exhibiting anodic electrochromic properties and further functional groups which can be reacted with the reactive groups of Polymer (A).

The number of each of the structures exhibiting cathodic electrochromic properties and anodic electrochromic properties is preferably 2 or less. In other word, Compound (A) is one or more organic compounds selected from the group consisting of those having one cathodic electrochromic properties-exhibiting structure and one anodic electrochromic properties-exhibiting structure per molecule, those having one cathodic electrochromic properties-exhibiting structure and two anodic electrochromic properties-exhibiting structures per molecule, those having two cathodic electrochromic properties-exhibiting structures and one anodic electrochromic properties-exhibiting structure per molecule, and those having two cathodic electrochromic properties-exhibiting structures and two anodic electrochromic properties-exhibiting structures per molecule.

The term "cathodic electrochromic properties-exhibiting structure" used herein denotes either one of styrene compound derivative structure, viologen compound derivative structure, or anthraquinone-based compound derivative structure. The term "anodic electrochromic properties-exhibiting structure" used herein denotes either one of pyrazoline-based compound derivative structure, metallocene compound derivative structure, phenylenediamine compound derivative structure, phenazine compound derivative structure, phenoxadine compound derivative structure, phenothiazine compound derivative structure, or tetrathiafulvalene derivative structure.

In the present invention, one preferred example for Compound (A) is an organic compounds having a bipyridinium ion-pair structure represented by formula (1) given below as a structure exhibiting cathodic electrochromic properties and a metallocene structure represented by formula (2) or (3) given below as a structure exhibiting anodic electrochromic properties and functional groups such as hydroxyl, isocyanate, glycidyl, carboxyl, amino, and thiol groups:

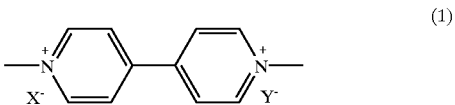

(1)

(2)

(3)

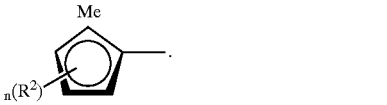

In formula (1), $X^-$ and $Y^-$ may be the same or different and are each independently a pair-anion selected from the group consisting of a halogen anion, $ClO_4^-$, $BF_4^-$, $PF_6^-$, $CHCOO^-$, and $CH_3(C_6H_4)SO_3^-$. Examples of the halogen anion are $F^-$, $Cl^-$, $Br^-$, and $I^-$.

In formulae (2) and (3), $R^1$ and $R^2$ may be the same or different and are each independently a hydrocarbon groups selected from the group consisting of alkyl, alkenyl, and aryl groups having 1 to 10 carbon atoms. Examples of the alkyl group are methyl, ethyl, i-propyl, n-propyl, n-butyl, t-butyl, n-pentyl, n-hexyl, and cyclohexyl groups. The aryl group is exemplified by phenyl group. Particularly preferred are methyl, ethyl, and propyl groups.

In the case where $R^1$ or $R^2$ is an aryl group, the aryl group may form a condensed ring such as a indene ring by bonding to a cyclopentadienyl ring and $R^1$ or $R^2$ may be a group cross-linking two cyclopentadienyl rings in the metallocene structure.

The letter "m" is an integer of $0 \leq m \leq 4$, and the letter "n" is an integer of $0 \leq n \leq 4$. Both m and n are preferably 0 or 1, and particularly preferably 0.

Me represents Cr, Co, Fe, Mg, Ni, Os, Ru, V, X—Hf—Y, X—Mo—Y, X—Nb—Y, X—Ti—Y, X—V—Y, or X—Zr—Y and is preferably Fe. X and Y referred herein are each independently hydrogen, halogen or an alkyl group having 1 to 12 carbon atoms and may be the same or different.

Another preferred example for Compound (A) is having a bipyridinium ion-pair structure represented by formula (1) given above as a structure exhibiting cathodic electrochromic properties and a dihydrophenazine structure represented by formulae (4) through (7) given below as a structure exhibiting anodic electrochromic properties and functional groups such as hydroxyl, isocyanate, glycidyl, carboxyl, amino, and thiol groups:

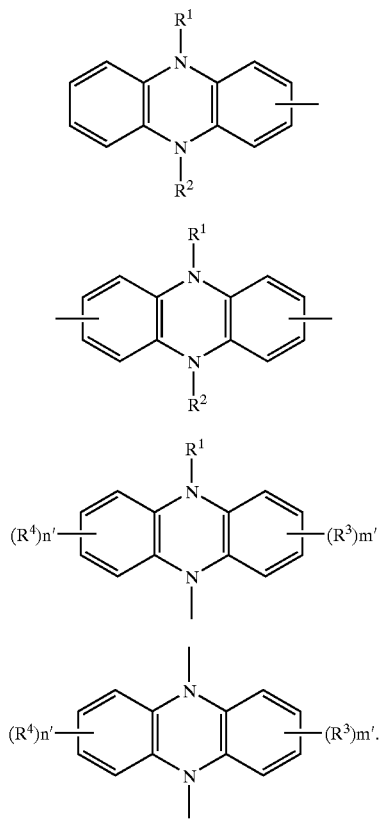

In formulae (4) through (7), $R^1$ through $R^4$ may be the same or different and are each independently a hydrocarbon groups selected from the group consisting of alkyl, alkenyl, and aryl groups having 1 to 10 carbon atoms. Examples of the alkyl group are methyl, ethyl, i-propyl, n-propyl, n-butyl, t-butyl, n-pentyl, n-hexyl, and cyclohexyl groups. The aryl group is exemplified by phenyl group. Particularly preferred are methyl, ethyl, and propyl groups.

The letter "m'" is an integer of $0 \leq m' \leq 4$, and the letter "n'" is an integer of $0 \leq n' \leq 4$. Both m and n are preferably 0 or 1 and particularly preferably 0.

Preferred organic compounds for Compound (A) are also those represented by formulae (12) through (17):

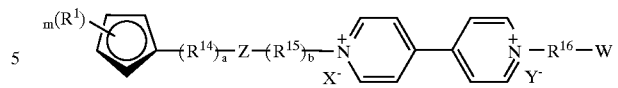

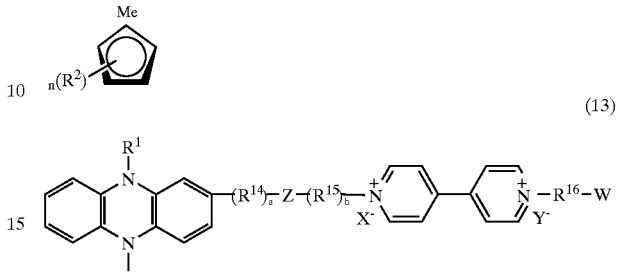

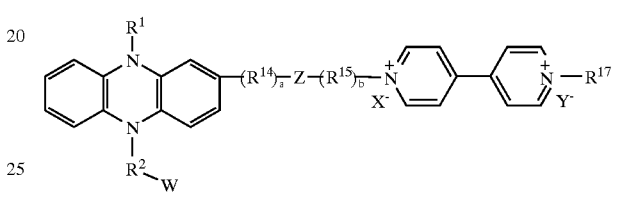

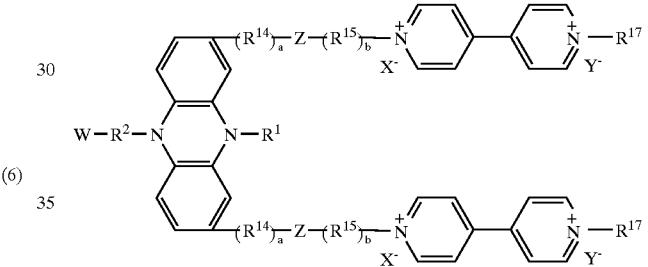

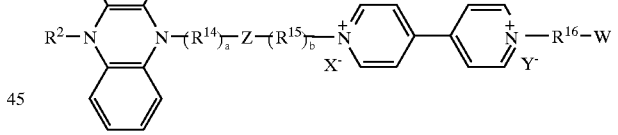

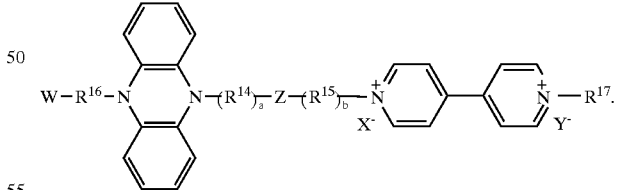

In formulae (12) through (17), $R^1$, $R^2$, m, n, $X^-$, and $Y^-$ are the same as those defined in formulae (1) through (3). $R^{17}$ is a hydrocarbon groups selected from the group consisting of alkyl, alkenyl, and aryl groups having 1 to 10 carbon atoms. Examples of the alkyl group are methyl, ethyl, i-propyl, n-propyl, n-butyl, t-butyl, n-pentyl, n-hexyl, and cyclohexyl groups. The aryl group is exemplified by phenyl group. $R^{14}$, $R^{15}$, and $R^{16}$ may be the same or different and are each an alkylene group having 1 to 20 carbon atoms. Specific examples of preferred alkylene groups are methylene, ethylene, propylene, and butylene groups. a is an integer of 0 or 1. W is selected from hydroxyl, isocyanate, glycidyl, carboxyl, amino, and thiol groups. Z is selected from —CH$_2$—, —COO—, —OCO—, —CONH—, —NHCO—, —OCONH—, —NHOCO—, —O—, and —S—.
specific examples of the compounds represented by formulae (12) through (17) are as follows:
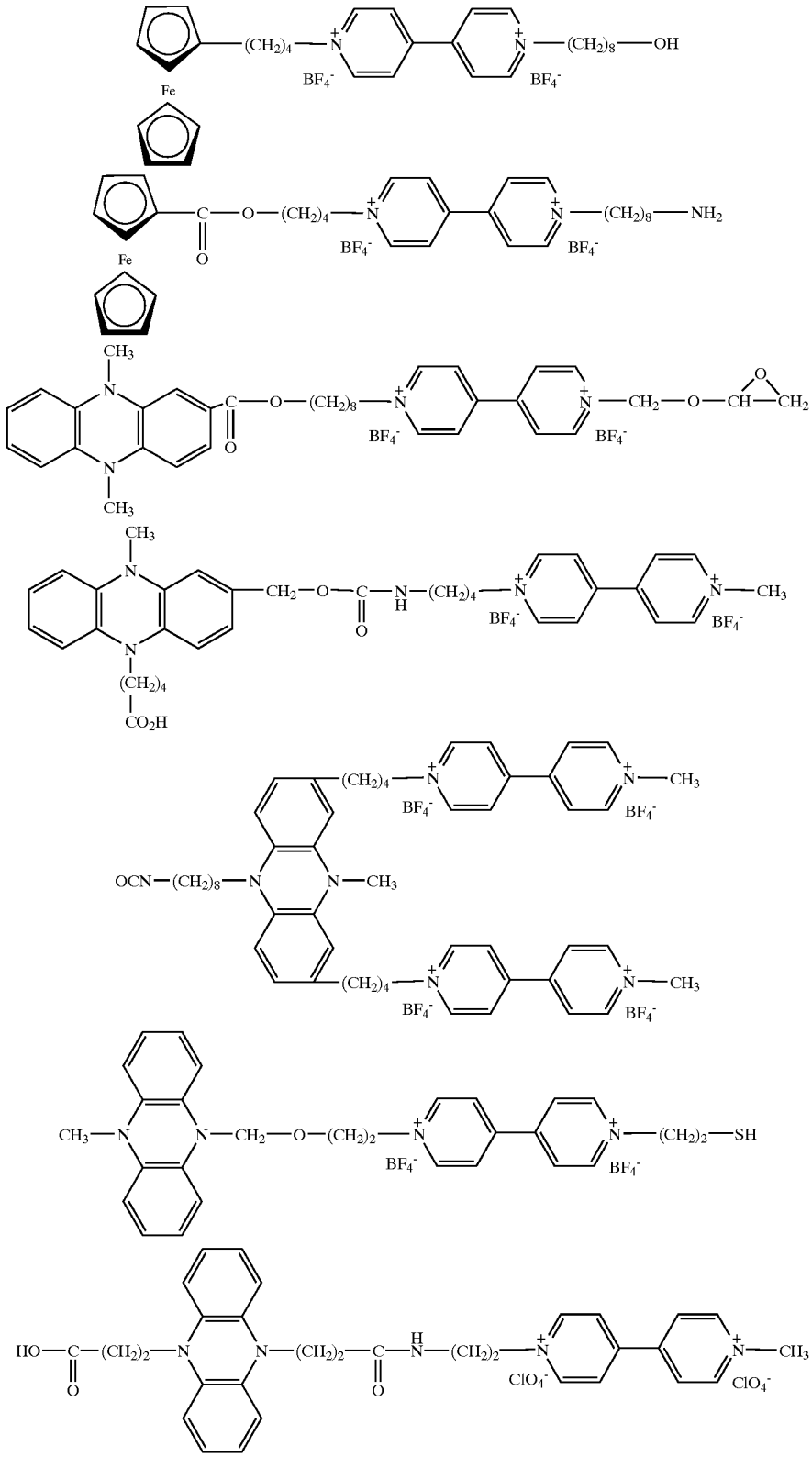

An EC polymer used as an electrochromic active substance in the EC device of the present invention can be obtained by reacting Polymer (A) and Compound (A). That is, the EC polymer of the present invention is a reaction product of Polymer (A) and Compound (A).

The method of reacting Polymer (A) and Compound (A) is the same as that generally employed in the organic chemistry field. For example, in the case of reacting Compound (A) having a hydroxyl group and Polymer (A) having an isocyanate group, a solution of a mixture of Polymer (A) and Compound (A) is heated thereby obtaining an EC polymer wherein Polymer (A) and Compound (A) are bonded through a urethane bond. In such a case, the reaction can be progressed at a low temperature by adding a Lewis acid catalyst such as dibutyl tin dilaurylate in the reaction system. Eligible solvents are ethers, ketones, and esters and are more specifically diglyme, propylene glycol monoacetate monomethyl ether, methylethylketone, methylisobutylketone, γ-butyrolactone, and propylene carbonate. The solvents may be mixed. The catalyst is added in an amount of usually 0.1 to 50 mol % and preferably 1 to 10 mol % based on the number of moles of the reactive functional groups. The reaction temperature is within the range of usually 40° C. to 120° C. and preferably 45° C. to 110° C. The reaction time is within the range of usually 15 minutes to 40 hours and preferably 30 minutes to 20 hours.

When Polymer (A) is reacted with Compound (A), their amounts is preferably adjusted such that the reactive groups are equivalent to the functional groups.

After completion of the reaction, the EC polymer is isolated by vacuum-distilling the solvent or separating the polymer precipitated by being added dropwise in a solvent such as hexane which has low solubility of the EC polymer. Alternatively, in the case of using a solvent such as γ-butyrolactone and propylene carbonate which are solvents having a large dielectric constant, the solvents can be used as those for a liquid or gelatinized ion conductive layer. Therefore, when a liquid or gelatinized ion conductive layer is used for the ion conductive layer of the EC device, the isolation of the EC polymer from the reaction solution may be omitted.

The ion conductive layer in an electrochromic device has an ion conductivity of $1 \times 10^{-7}$ S/cm or greater at room temperature and a function to color, decolor, and discolor the above-described electrochromic active substance. Such an ion conductive layer may be formed using either a liquid-, gelatinized liquid- or solid-type ion conductive substance. Solid-type ion conductive substances is preferably used such that it is possible to produce a solid-type electrochromic device for practical use.

Liquid-Type Ion Conductive Substance

A liquid-type ion conductive substance is prepared by dissolving a supporting electrolyte such as salts, acids, and alkalis in a solvent.

Eligible solvents are any type of those generally used in electrochemical cells and batteries. Specific examples of such solvents are water, acetic anhydride, methanol, ethanol, tetrahydrofuran, propylene carbonate, nitromethane, acetonitrile, dimethylformamide, dimethylsulfoxide, hexamethylphosamide, ethylene carbonate, dimethoxyethane, γ-butyrolactone, γ-valerolactone, sulforan, dimethoxyethane, propionnitrile, glutaronitrile, adiponitrile, methoxyacetonitrile, dimethylacetoamide, methylpyrrolidinone, dimethylsulfoxide, dioxolane, trimethylphosphate and polyethylene glycol. Preferred are propylene carbonate, ethylene carbonate, dimethylsulfoxide, dimethoxyethane, acetonitrile, γ-butyrolactone, sulforan, dioxolane, dimethylformamide, dimethoxyethane, tetrahydrofuran, adiponitrile, methoxyacetonitrile, dimethylacetoamide, methylpyrrolidinone, dimethylsulfoxide, dioxolane, trimethylphosphate, and polyethylene glycol. The solvent may be used individually or in combination.

Although not restricted, the solvent is used in an amount of 20 percent by mass or greater, preferably 50 percent by mass or greater, and more preferably 70 percent by mass of the ion conductive layer. The upper limit is 98 percent by mass, preferably 95 percent by mass, and more preferably 90 percent by mass.

Eligible supporting electrolytes are salts, acids, and alkalis which are generally used in the filed of electrochemistry or batteries.

Salts may be inorganic ion salts such as alkali metal salts and alkaline earth metal salts, quaternary ammonium salts, cyclic quaternary ammonium salts, and quaternary phosphonium salts. Specific examples of such salts are alkali metal salts, such as $LiClO_4$, $LiSCN$, $LiBF_4$, $LiAsF_6$, $LiCF_3SO_3$, $LiPF_6$, $LiI$, $NaI$, $NaSCN$, $NaClO_4$, $NaBF_4$, $NaAsF_6$, $KSCN$ and $KCl$, quaternary ammonium salts such as $(CH_3)_4NBF_4$, $(C_2H_5)_4NBF_4$, $(n-C_4H_9)_4NBF_4$, $(C_2H_5)_4NBr$, $(C_2H_5)_4NClO_4$, $(n-C_4H_9)_4NClO_4$, $(C_2H_5)_3CH_3NBF_4$, $(C_2H_5)_3CH_3NClO_4$, $(C_2H_5)_2(CH_3)_2NBF_4$, $(C_2H_5)_2(CH_3)_2ClO_4$, $(C_2H_5)(CH_3)_3NBF_4$, $(C_2H_5)(CH_3)_3NClO_4$, and those represented by the following formulae:

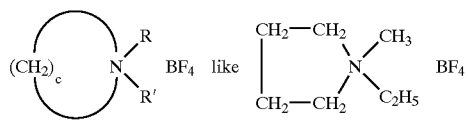

wherein c is an integer of 4 or 5 and R and R' are each methyl or ethyl group;

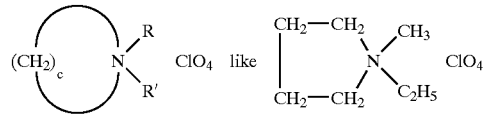

wherein c is an integer of 4 or 5 and R and R' are each methyl or ethyl group;

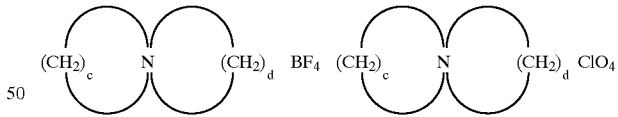

wherein c and d are each 4 or 5; quaternary phosphonium salts such as $(CH_3)_4PBF_4$, $(C_2H_5)_4PBF_4$, $(C_3H_7)_4PBF_4$, and $(C_4H_9)_4PBF_4$; and mixtures thereof.

No particular limitation is imposed on acids. Eligible acids are inorganic acids and organic acids, and more specifically sulfuric acid, hydrochloric acid, phosphoric acids, sulfonic acids, and carboxylic acid.

No particular limitation is imposed on alkalis. Eligible alkalis are sodium hydroxide, potassium hydroxide, and lithium hydroxide.

The amount of the supporting electrolyte is arbitrary selected. Generally, the supporting electrolyte is present in an amount of 0.01 M or greater, preferably 0.1 M or greater, and more preferably 0.5 M or greater. The upper limit is 20 M, preferably 10 M, and more preferably 5 M.

Gelatinized Liquid Ion Conductive Substance

The term "gelatinized liquid ion conductive substance" designates a substance obtained by thickening or gelatinizing the above-described liquid-type ion conductive substance. The gelatinized liquid ion conductive substance is prepared by blending a polymer or a gelatinizer with a liquid-type ion conductive substance.

No particular limitation is imposed on the polymer. Eligible polymers are polyacrylonitrile, carboxymethyl cellulose, poly vinyl chloride, polyethylene oxide, polyurethane, polyacrylate, polymethacrylate, polyamide, polyacrylicamide, cellulose, polyester, polypropylene oxide and nafion.

No particular limitation is imposed on the gelatinizer. Eligible gelatinizers are oxyethylene methacrylate, oxyethylene acrylate, urethaneacrylate, acrylicamide and agar-agar.

Solid-Type Ion Conductive Substance

The term "solid-type ion conductive substance" designates a substance which is solid at room temperature and has an ion conductivity. Such substances are exemplified by polyethyleneoxide, a polymer of oxyethylenemethacrylate, nation, polystylene sulfonate, $Li_3N$, $Na$-$\beta$-$Al_2O_3$, and $Sn(HPO_4)_2 \cdot H_2O$. Other than these, there may be used a polymeric solid electrolyte obtained by dispersing a supporting electrolyte in a polymeric compound obtained by polymerizing an oxyalkylene(metha)acrylate-based compound or a urethane acrylate-based compound.

First examples of the polymer solid electrolytes recommended by the present invention are those obtained by solidifying a composition containing the above-described organic polar solvent and supporting electrolyte used arbitrary and a urethaneacrylate represented by formula (18) below.

The term "cure" used herein designates a state where the polymerizable monomer in the mixture is cured with the progress of polymerization or crosslinking and thus the entire mixture does not flow at room temperature. The composition thus cured often has the basic structure in the form of network (three-dimensional network structure).

Formula (18) is represented by

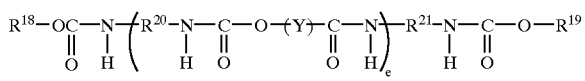
(18)

wherein $R^{18}$ and $R^{19}$ are each independently a group selected from those represented by formulae (19), (20) and (21), $R^{20}$ and $R^{21}$ are each independently a divalent hydrocarbon group having 1 to 20 and preferably 2 to 12 carbon atoms, Y is a polyether unit, a polyester unit, a polycarbonate unit or a mixed unit thereof, e is an integer of 1 to 100, preferably 1 to 50, and more preferably 1 to 20:

formulae (19), (20) and (21) being represented by

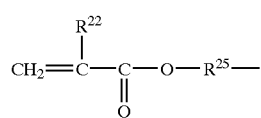
(19)

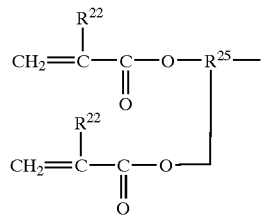
(20)

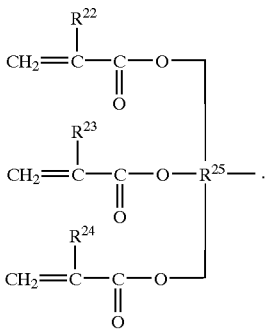
(21)

In formulae (19), (20), and (21), $R^{22}$, $R^{23}$ and $R^{24}$ may be the same or different and are each independently hydrogen or an alkyl group having 1 to 3 carbon atoms and $R^{25}$ is a divalent to quatervalent organic residue having 1 to 20, preferably 2 to 8 carbon atoms. Specific examples of the organic residue are hydrocarbon residues such as alkyltolyl groups, alkyltetratolyl groups and alkylene groups represented by the formula

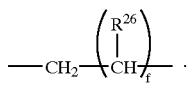
(22)

In formula (22), $R^{26}$ is an alkyl group having 1 to 3 alkyl group or hydrogen, b is an integer of 0 to 6 and if b is 2 or greater, the groups of $R^{26}$ may be the same or different.

The hydrogen atoms in formula (22) may be partially substituted by an oxygen-containing hydrocarbon group such as an alkoxy group having 1 to 6, preferably 1 to 3 carbon atoms and an aryloxy group having 6 to 12 carbon atoms.

Specific examples of the organic residue of $R^{22}$ are methylene, tetramethylene, 1-methyl-ethylene, 1,2,3-propanetoriyl, and neopentanetoriyl.

The divalent hydrocarbon group for $R^{20}$ and $R^{21}$ in formula (18) may be exemplified by aliphatic hydrocarbon groups, aromatic hydrocarbon groups and alicyclic hydrocarbon groups. The aliphatic hydrocarbon group may be an alkylene group represented by formula (22) above.

The divalent aromatic and alicyclic hydrocarbon groups may be exemplified by hydrocarbon groups represented by the following formulae (23), (24) and (25):

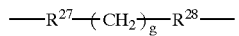
(23)

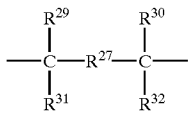
(24)

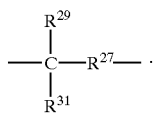
(25)

In formulae (23) through (25), $R^{27}$ and $R^{28}$ may be the same or different and are each independently a phenylene group, a substituted phenylene group (an alkyl-substituted phenylene group), a cycloalkylene group and a substituted cycloalkylene group (an alkyl-substituted cycloalkylene group), and $R^{29}$, $R^{30}$, $R^{31}$ and $R^{32}$ are each independently hydrogen or an alkyl group having 1 to 3 carbon atoms, and c is an integer of 1 to 5.

Specific examples of $R^{20}$ and $R^{21}$ in formula (18) are the following divalent groups:

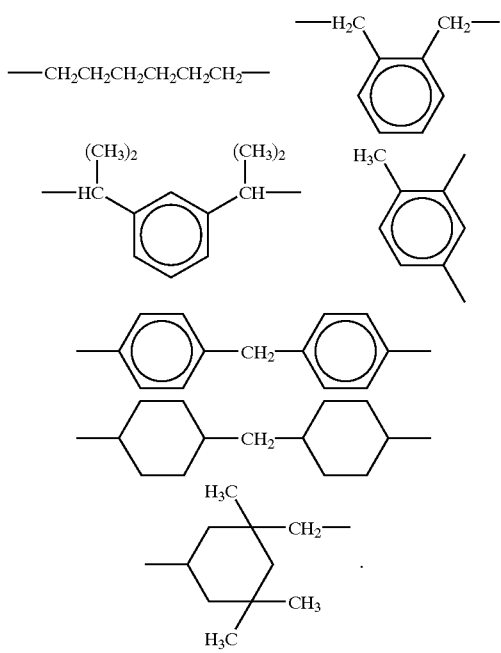

In formula (18), Y indicates a polyether unit, a polyester unit, a polycarbonate unit or mixed units thereof. Each of these units is represented by the following formulae:

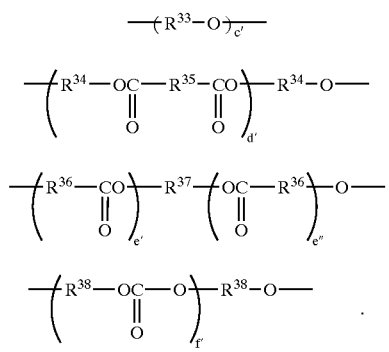

In formulae (a) through (d), $R^{33}$, $R^{34}$, $R^{35}$, $R^{36}$, $R^{37}$ and $R^{38}$ may be the same or different and are each independently a divalent hydrocarbon group residue having 1 to 20 and preferably 2 to 12 carbon atoms. The hydrocarbon residue is preferably a straight-chain or branched alkylene group. More specifically, $R^{35}$ is preferably methylene, ethylene, trimethylene, tetramethylene, pentamethylene, hexamethylene, and propylene groups. Specific examples of $R^{33}$, $R^{34}$, $R^{36}$, $R^{37}$ and $R^{38}$ are ethylene and propylene groups. c' is an integer of 2 to 300, preferably 10 to 200. d' is an integer of 1 to 300, preferably 2 to 200. e' is an integer of 1 to 200, preferably 2 to 100. e" is an integer of 1 to 200, preferably 2 to 200. f' is an integer of 1 to 300, preferably 10 to 200.

In formulae (a) through (d), each of the units may be the same or different. In other words, if there exist a plurality of the groups of each $R^{33}$ through $R^{38}$, the groups of each $R^{33}$ through $R^{38}$ may be the same or different.

The polyurethane monomer of formula (18) has a molecular-average molecular weight in the range of 2,500 to 30,000, preferably 3,000 to 20,000 and has preferably 2 to 6, more preferably 2 to 4 functional groups per molecule. The polyurethane monomer of formula (18) may be prepared by any suitable conventional method.

A polymeric solid electrolyte containing an urethaneacrylate of formula (18) is prepared by admixing a urethaneacrylate, a solvent and a supporting electrolyte both described with respect to the liquid type ion conductive substance so as to obtain a precursor composition and solidifying the composition. The amount of the solvent is selected from the range of 100 to 1,200 parts by weight, preferably 200 to 900 parts by weight per 100 parts by weight of the urethaneacrylate. A too less amount of the solvent would result in insufficient ion conductivity, while a too much amount of the solvent would cause reduced mechanical strength. No particular limitation is imposed on the supporting electrolyte and it may not be added. The amount of the supporting electrolyte is within the range of from 0.1 to 30 percent by mass and preferably 1 to 20 percent by mass.

If necessary, cross-linkers or polymerization initiators may be added to the polymeric solid electrolyte containing the urethaneacrylate.

Second examples of the polymeric solid substance recommended by the present invention are those obtained by solidifying a composition comprising a solvent, a supporting electrolyte which may not be added, an acryloyl- or methacrylate-modified polyalkylene oxide (both hereinafter referred to as "modified polyalkylene oxide".

The modified polyalkylene oxide encompasses monofunctional-, bifunctional- and polyfunctional-modified polyalkylene oxides. These modified polyalkylene oxides may be used individually or in combination. It is preferred to use a monofunctional modified polyalkylene oxide as an essential component in combination with bifunctional and/or polyfunctional ones. It is particularly preferred to use a monofunctional modified polyalkylene oxide mixed with a bifunctional one. The mix ratio is arbitrary selected. Bifunctional- and/or polyfunctional-modified polyalkylene oxides are used in a total amount of 0.1 to 20 parts by weight, preferably 0.5 to 10 parts by weight of 100 parts by weight of a monofunctional polyalkylene oxide.

A monofunctional modified polyalkylene oxide is represented by the formula

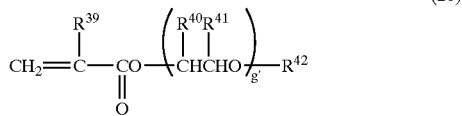 (26)

wherein $R^{39}$, $R^{40}$, $R^{41}$ and $R^{42}$ are each hydrogen and an alkyl group having from 1 to 5 carbon atoms and g' is an integer of 1 or greater.

In formula (26), examples of the alkyl group of $R^{39}$, $R^{40}$, $R^{41}$ and $R^{42}$ which may be the same or different include methyl, ethyl, i-propyl, n-propyl, n-butyl, t-butyl and n-pentyl. Preferred for $R^{39}$, $R^{40}$ and $R^{41}$ are hydrogen and a methyl group. Preferred for $R^{42}$ are hydrogen and methyl and ethyl groups.

In formula (26), g' is an integer of 1 or greater and within the range of usually $1 \leq g' \leq 100$, preferably $2 \leq g' \leq 50$, and more preferably $2 \leq g' \leq 30$.

Specific examples of the compound of formula (26) are those having 1 to 100, preferably 2 to 50, more preferably 2 to 20 oxyalkylen units, such as methoxypolyethylene glcyol methacrylate, methoxypolypropylene glycol methacrylate, ethoxypolyethylene glycol methacrylate, ethoxypolypropylene glycol methacrylate, methoxypolyethylene glycol acrylate, methoxypolypropylene glycol acrylate, ethoxypolyethylene glycol acrylate, ethoxypolypropylene glycol acrylate and mixtures thereof. Among these, preferred are methoxypolyethylene glcyol methacrylate and methoxypolyethylene glycol acrylate.

If g' is 2 or greater, the monofunctional modified polyalkylene oxide may be those having different oxyalkylene units, that is, copolymerized oxyalkylene units which may be alternating-, block- or random-polymerized and have 1 to 50, preferably 1 to 20 oxyethylene units and 1 to 50, preferably 1 to 20 oxypropylene units. Specific examples of such copolymers are methoxypoly(ethylene.propylene) glycol methacrylate, ethoxypoly(ethylene.propylene)glycol methacrylate, methoxypoly(ethylene.propylene)glycol acrylate, ethoxypoly(ethylene.propylene)glycol acrylate and mixtures thereof.

The difunctional modified polyalkylene oxide is represented by the formula

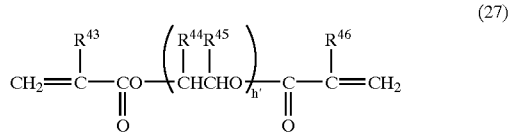 (27)

wherein $R^{43}$, $R^{44}$, $R^{45}$ and $R^{46}$ are each independently hydrogen or an alkyl group having 1 to 5 carbon atoms and h' is an integer of 1 or greater.

The polyfunctional modified polyalkylene oxide having 3 or more functional groups is represented by the formula

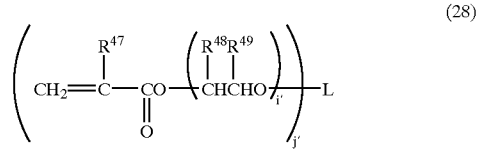 (28)

wherein $R^{47}$, $R^{48}$ and $R^{49}$ are each independently hydrogen or an alkyl group having 1 to 5 carbon atoms, i' is an integer of 1 or greater, j' is an integer of 2 to 4, and L is a connecting groups of valence represented by "j'".

In formula (27), $R^{43}$, $R^{44}$, $R^{45}$ and $R^{46}$ are each independently hydrogen or an alkyl group having 1 to 5 carbon atoms. Specific examples of the alkyl group are methyl, ethyl, i-propyl, n-propyl, n-butyl, t-butyl, and n-pentyl groups. It is preferred that $R^{43}$ is hydrogen or methyl group, $R^{44}$ is hydrogen or methyl group, $R^{45}$ is hydrogen or methyl group, and $R^{46}$ is hydrogen or methyl group.

The letter "h'" in formula (27) is an integer of 1 or greater and within the range of usually $1 \leq h' \leq 100$, preferably $2 \leq h' \leq 50$, more preferably $2 \leq h' \leq 30$. Specific examples of such compounds are those having 1 to 100, preferably 2 to 50, more preferably 2 to 20 of oxyalkylene units, such as polyethylene glycol dimethacrylate, polypropylene glycol dimethacrylate, polyethylene glycol methacrylate, polypropylene glycol dimethacrylate, and mixtures thereof.

If h' is 2 or greater, the difunctional modified polyalkylene oxide may be those having different oxyalkylene units, that is, copolymerized oxyalkylene units which may be alternating-, block- or random-polymerized and have 1 to 50, preferably 1 to 20 oxyethylene units and 1 to 50, preferably 1 to 20 oxypropylene units. Specific examples of such copolymers are poly(ethylene.propylene)glycol dimethacrylate, poly(ethylene.propylene)glycol diacrylate, and mixtures thereof.

$R^{47}$, $R^{48}$ and $R^{49}$ in formula (28) are each independently hydrogen or an alkyl group having 1 to 5 carbon atoms. Specific examples of the alkyl group are methyl, ethyl, i-propyl, n-propyl, n-butyl, t-butyl and n-pentyl groups. $R^{47}$, $R^{48}$ and $R^{49}$ are each preferably hydrogen or methyl group.

In formula (28), i' is an integer of 1 or greater and within the range of usually $1 \leq i' \leq 100$, preferably $2 \leq i' \leq 50$, and more preferably $2 \leq i' \leq 30$.

The letter "j'" denotes a number of connecting group "L" and is an integer of $2 \leq j' \leq 4$.

Connecting group "L" is a divalent, trivalent or quatravalent hydrocarbon group having 1 to 30, preferably 1 to 20 carbon atoms. The divalent hydrocarbon group may be alkylene, arylene, arylalkylene and alkylarylene groups and hydrocarbon groups having those groups as a main chain. Specific examples of the divalent hydrocarbon group are a methylene group, an ethylene group and a group represented by

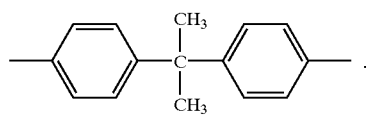

The trivalent hydrocarbon group may be alkyltriyl, aryltriyl, arylalkyltriyl, alkylaryltriyl and hydrocarbon groups having those groups as the main chain. Specific examples of the trivalent hydrocarbon group are those represented by the following formulae

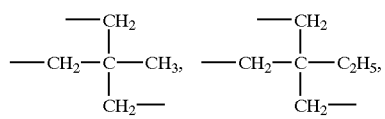

-continued

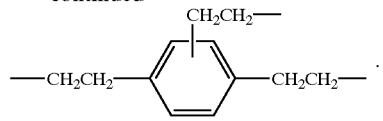

The quatravalent hydrocarbon group may be alkyltetrayl, aryltetrayl, arylalkyltetrayl and alkylaryltetrayl groups and hydrocarbon groups having these groups as the main chain. Specific examples of the quatravalent hydrocarbon groups are those represented by the following formulae:

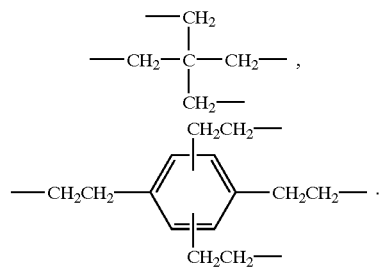

Specific examples of the compound are those having 1 to 100, preferably 2 to 50, more preferably 1 to 20 oxyalkylene units, such as trimethylolpropanetri(polyethylene glycol acrylate), trimethylolpropanetri (polyethylene glycol methaacrylate), trimethylolpropanetri (polypropylene glycol acrylate), trimethylolpropanetri (polypropylene glycol methaacrylate), tetramethylolmethanetetra(polyethylene glycol acrylate), tetramethylolmethanetetra (polyethylene glycol methaacrylate), tetramethylolmethanetetra (polypropylene glycol acrylate), tetramethylolmethanetetra (polypropylene glycol methaacrylate), 2,2-bis[4-(acryloxypolyethoxy)phenyl]propane, 2,2-bis[4-(methaacryloxypolyethoxy)phenyl]propane, 2,2-bis[4-(acryloxypolyisopropoxy)phenyl]propane, 2,2-bis[4-(methaacryloxypolyisopropoxy)phenyl]propane and mixtures thereof.

If i' in formula (28) is 2 or greater, the compound may be those having different oxyalkylene units from each other, that is, copolymerized oxyalkylene units which result from alternating-, block- or random-copolymerization. Specific examples of such compounds are those having 1 to 50, preferably 1 to 20 of oxyethylene units and 1 to 50, preferably 1 to 20 of oxypropylene units such as trimethylolpropanetri(poly(ethylene.propylene)glycol acrylate), trimethylolpropanetri(poly(ethylene.propylene) glycol methaacrylate), tetramethylolmethanetetra(poly (ethylene.propylene)glycol acrylate), tetramethylolmethanetetra(poly(ethylene.propylene)glycol acrylate) and mixtures thereof.

There may be used the difunctional modified polyalkyleneoxide of formula (27) and the polyfunctional modified polyalkyleneoxide of formula (28) in combination. When these compounds are used in combination, the weight ratio of these compounds is within the rangeof 0.01/99.9–99.9/0.01, preferably 1/99–99/1, more preferably 20/80–80/20.

A polymeric solid electrolyte containing the above-described modified polyalkylene oxide is prepared by admixing the modified polyalkylene oxide, a solvent and a supporting electrolyte both described with respect to the liquid type ion conductive substance so as to obtain a precursor composition and solidifying the composition. The amount of the solvent is selected from the range of 50 to 800 percent by mass, preferably 100 to 500 percent by mass per of the total mass of the modified polyalkylene oxide. The amount of the supporting electrolyte is within the range of from 1 to 30 percent by mass and preferably 3 to 20 percent by mass of the total amount of the modified polyalkylene oxide and the solvent.

If necessary, cross-linkers or polymerization initiators may be added to the polymeric solid electrolyte containing the modified polyalkylene oxide.

Cross-linkers which may be added to the polymeric electrolyte are acrylate-based cross-linkers having two or more functional groups. Specific examples are ethylene glycol dimethacrylate, diethylene glycol dimethacrylate, tetraethylene glycol dimethacrylate, ethylene glycol diacrylate, diethylene glycol diacrylate, triethylene glycol diacrylate, polyethylene glycol dimethacrylate, polyethylene glycol diacrylate, neopentyl glycol diacrylate, 1,6-hexanediol diacrylate, trimethylolpropane trimethacrylate, trimethylolpropane triacrylate, tetramethylolmethane tetracrylate, and tetramethylolmethane tetramethacrylate. These may be used individually or in combination.

The amount of the cross-linker is 0.01 percent by mol or more, preferably 0.1 percent by mol or more, of 100 percent by mole of the polymeric urethaneacrylate or modified polyalkylene oxide contained in the polymeric solid electrolyte. The upper limit is 10 percent by mol and preferably 5 percent by mol.

Polymerization initiators which may be added to the polymeric solid electrolyte are photo-polymerization initiators and thermal-polymerization initiators.

No particular limitation is imposed on the type of the photo-polymerization initiators. Therefore, the photo-polymerization initiators may be conventional ones which are benzoin-, acetophenone-, benzylketal- or acylphosphine oxide-based. Specific examples of such photo polymerization initiators are acetophenone, benzophenone, 4-methoxybenzophenone, benzoin methyl ether, 2,2-dimethoxy-2-phenyldimethoxy-2-phenylacetophenone, 2-methylbenzoyl, 2-hydroxy-2-methyl-1-phenyl-1-on, 1-(4-isopropylphenyl)-2-hydroxy-2-methylpropane-1-on, triphenylphosphine, 2-chlorothioxantone, 2-hydroxy-2-methyl-1-phenylpropane-1-on, 1-hydroxycyclohexylphenylketone, 2,2-dimethoxy-2-phenylacetophenone, 2-methyl-(4-(methylthio)phenyl)-2-morpholino-1-propanone, 2-benzyl-2-dimethylamino-1-(4-morpholinophenyl)-butane-1-on, 1-(4-(2-hydroxyethoxy) phenyl)-2-hydroxy-2-methyl-1-on, diethoxyacetophenone, and 2,4,6-trimethylbenzoyldiphenylphosphine oxide. These may be used individually or in combination.

Eligible thermal polymerization initiators may be selected from known initiators such as peroxide initiators or azo-based initiators. Specific examples of such peroxide initiators are benzoyl peroxide, methylethyl peroxide, t-butylperoxypivalate and diisopropylperoxycarbonate. Specific examples of such azo-based initiators are 2,2'-azobis (2-isobutylonitrile), 2,2'-azobisisobutylonitrile, 2,2'-azobis (2,4-dimethylvaleronitrile), and 1,1'-azobis(cyclohexane-1-carbonitrile). These may be used individually or in combination.

The amount of the polymerization initiators is 0.1 part by weight or more, 0.5 part by weight or more, of 100 parts by weight of the polymeric urethaneacrylate or modified polyalkylene oxide contained in the polymeric solid electrolyte. The upper limit is 10 part by weight or less and preferably 5 part by weight or less.

The polymeric solid electrolyte is solidified by photo- or thermal-curing the polymeric urethaneacrylate or modified alkylene oxide.

Photo-curing is progressed by irradiating far ultraviolet rays, ultraviolet rays or visible rays to the polymeric solid electrolyte containing a photo-polymerization initiators. Eligible light sources are high voltage mercury lamps, fluorescent lamps and xenon lamps. Although not restricted, the photo polymerization is conducted by irradiating light of 100 mJ/cm$^2$ or higher, preferably 1,000 J/cm$^2$ or higher. The upper limit is 50,000 mJ/cm$^2$, preferably 20,000 mJ/cm$^2$.

Thermal curing is progressed by heating the polymeric solid electrolyte containing a thermal-polymerization initiators at a temperature of 0° C. or higher and preferably 20° C. or higher. The heating temperature is 130° C. or lower and preferably 80° C. or lower. The curing is continued for usually 30 minutes or longer and preferably one hour or longer and 100 hours or shorter and preferably 40 hours or shorter.

As described above, the ion conductive layer of the present invention contains the above-described EC polymer but no particular limitation is imposed on the production method and form thereof. For example, a liquid-type ion conductive substance may be prepared by appropriately dispersing the EC polymer into the conductive substance. A gelatinized-type liquid ion conductive substance may be prepared by mixing at the precursor stage thereof with the EC polymer such that the compound is appropriately dispersed or dissolved in the substance. A solid type ion conductive substance may be prepared by mixing the EC polymer with the solid electrolyte in a unsolidified stage, beforehand and then solidifying the mixture, whereby the compound is suitably dispersed or dissolved in the substance. Alternatively, in the case of the polymeric solid electrolyte, the EC polymer is mixed with a solid electrolyte in a unsolidified state, that is, the aforesaid polymeric solid electrolyte precursor composition and cured whereby the resulting substance has the compound suitable dispersed or dissolved therein.

No particular limitation is imposed on the amount of the EC polymer to be present in the above-described ion conductive layer. However, the lower limit concentration of the electrochromic active unit owned by the EC polymer is usually 1 mM or more, preferably 5 mM or more, and more preferably 10 mM or more based on the total mass of the ion conductive layer. The upper limit is 200 mM or less, preferably 100 mM or less, and more preferably 50 mM or less.

The above-mentioned "electrochromic active unit" denotes a structural unit exhibiting electrochromic properties introduced from Compound (A) into the EC polymer by reacting Compound (A) with Polymer (A).

Regardless of whether the ion conductive substance is liquid, gelatinized liquid or solid, the ion conductive layer used in the present invention may contain ultraviolet absorbing agents for the purpose of enhancing the light-resistance. Such ultraviolet absorbing agents may be benzotriazole-, benzophenone-, triazine-, salicylate-, cyanoacrylate-, and oxalic anilide-based compounds. Among these, benzotriazole- and benzophenone-based compounds are preferred.

Benzotriazole-based compounds are exemplified by compounds represented by the formula

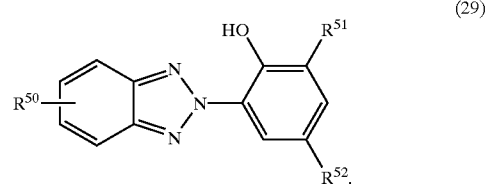

(29)

In formula (29), $R^{50}$ is hydrogen, halogen or an alkyl group having 1 to 10, preferably 1 to 6 carbon atoms. Specific examples of the halogen are fluorine, chlorine, bromine and iodine. Specific examples of the alkyl group are methyl, ethyl, propyl, i-propyl, butyl, t-butyl and cyclohexyl groups. Preferred for $R^{50}$ are hydrogen and chlorine. $R^{50}$ is usually substituted at the 4- or 5-position of the benzotriazole ring but the halogen atom and the alkyl group are usually located at the 5-position. $R^{51}$ is hydrogen or a hydrocarbon group having 1 to 10, preferably 1 to 6 carbon atoms. Examples of the hydrocarbon groups are methyl, ethyl, propyl, i-propyl, butyl, t-butyl, t-amyl, cyclohexyl, and 1,1-dimethylbenzyl groups. Particularly preferred are t-butyl, t-amyl and 1,1-dimethylbenzyl groups. $R^{52}$ is a carboxyl-substituted alkyl (—R—COOH) or a carboxyl-substituted alkylidene group having 2 to 10, preferably 2 to 4 carbon atoms. The alkyl chain portion (—R—) may be methylene, ethylene, trimethylene, and propylene groups. The alkylidene may be ethylidene and propylidene groups. $R^{52}$ may be an alkyl group such as t-butyl, t-amyl, and 1,1,3,3-tetramethylbutyl groups, an alkanoic acid alkyl ester such as propionic acid octyl ester, and arylalkyl group such as 1,1-dimethylbenzyl group.

Specific examples of such benzotriazole-based compounds are 3-(5-chloro-2H-benzotriazole-2-yl)-5-(1,1-dimethylethyl)-4-hydroxy-benzene propanoic acid, 3-(2H-benzotriazole-2-yl)-5-(1,1-dimethylethyl)-4-hydroxy-benzene ethanoic acid, 3-(2H-benzotriazole-2-yl)-4-hydroxybenzene ethanoic acid, 3-(5-methyl-2H-benzotriazole-2-yl)-5-(1-methylethyl)-4-hydroxybenzene propanoic acid, iso-octyl-3-(3-(2H-benzotriazole-2-yl)-5-t-butyl-4-hydroxyphenylpropionate, methyl-3-[3-t-butyl-5-(2H-benzotriazole-2-yl)-4-hydroxyphenyl]propionate, 2-(5'-methyl-2'-hydroxyphenyl)benzotriazole, 2-[2'-hydroxy-3',5'-bis(α, α-dimethylbenzyl) phenyl]-2H-benzotriazole, 2-(2'-hydroxy-5'-t-butylphenyl) benzotriazol, 2-(3', 5'-di-t-butyl-2'-hydroxyphenyl) benzotriazole, 2-(2'-hydroxy-5'-t-octylphenyl) benzotriazole, 2-(3'-dodecyl-5'-methyl-2'-hydroxyphenyl) benzotriazole, 2-(2'-hydroxy-3', 5'-di-t-amyl-phenyl)-2H-benzotriazole, 2-(2'-hydroxy-3'-(3",4",5",6"-tetrahydrophthalimidemethyl)-5-methylphenyl)benzotriazole, 2-(3'-t-butyl-5'-methyl-2'-hydroxyphenyl)-5-chlorobenzotriazole, 2-(3',5'-di-t-butyl-2'-hydroxyphenyl)-5-chlorobenzotriazole, 2-[2-hydroxy-3,5-di(1,1-dimethylbenzyl) phenyl]-2H-benzotriazole, 2-[2-hydroxy-3-dimethylbenzyl-5-(1,1,3,3-tetramethylbutyl) phenyl]-2H-benzotriazole, 3-(5-chloro-2H-benzotriazole-2-yl)-5-t-butyl-4-hydroxyphenyl propanoic acid octyl ester, and 3-(5-chloro-2H-benzotriazole-2-yl)-5-t-butyl-4-hydroxyphenyl-n-propanol. Among these, particularly preferred are 3-(5-chloro-2H-benzotriazole-2-yl)-5-t-butyl-4-hydroxyphenylpropanoic acid octyl ester, and 3-(5-chloro-2H-benzotriazole-2-yl)-5-t-butyl-4-hydroxyphenyl-n-propanol.

Benzophenone-based compounds are exemplified by compounds represented by the following formulae

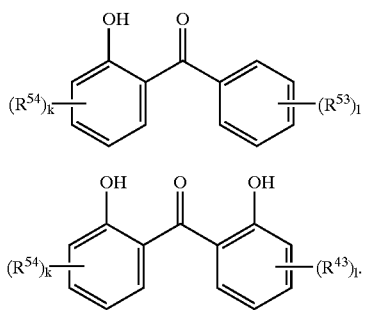

In formulae (30) and (31), $R^{53}$ and $R^{54}$ may be the same or different and are each independently a hydroxyl group or an alkyl or alkoxy group having 1 to 10, preferably 1 to 6 carbon atoms. The letters "k" and "l" each denotes an integer of $0 \leq k \leq 3$ and $0 \leq l \leq 3$. Specific examples of the alkyl group are methyl, ethyl, propyl, i-propyl, butyl, t-butyl, and cyclohexyl groups. Specific examples of the alkoxy group are methoxy, ethoxy, propoxy, i-propoxy, and butoxy groups.

Specific examples of the benzophenone-based compounds are 2-hydroxy-4-methoxybenzophenone-5-carboxylic acid, 2,2'-dihydroxy-4-methoxybenzophenone-5-carboxylic acid, 4-(2-hydroxybenzoyl)-3-hydroxybenzene propanoic acid, 2,4-dihydroxybenzophenone, 2-hydroxy-4-methoxybenzophenone, 2-hydroxy-4-methoxybenzophenone-5-sulfonic acid, 2-hydroxy-4-n-octoxybenzophenone, 2-hydroxy-4-dodecyloxybenzophenone 2,2'-dihydroxy-4-methoxybenzophenone, 2,2'-dihydroxy-4,4'-methoxybenzophenone, 2,2',4,4'-tetrahydroxybenzophenone, 2-hydroxy-4-methoxy-2'-carboxybenzophenone, and 2-hydroxy-4-methoxy-5-sulfonbenzophenone, among which preferred is 2,2',4,4'-tetrahydroxybenzophenone.

Examples of the triazine-based compounds are 2-(4,6-diphenyl-1,3,5-triazine-2-yl)-5-[(hexyl)oxy]-phenol, 2-[4-[(2-hydroxy-3-dodecyloxypropyl)oxy]-2-hydroxyphenyl]-4,6-bis(2,4-dimethylphenyl)-1,3,5-triazine, and 2-[4-[(2-hydroxy-3-tridecyloxypropyl)oxy]-2-hydroxyphenyl]-4,6-bis(2,4-dimethylphenyl)-1,3,5-triazine.

Examples of the salicylate-based compounds are phenylsalicylate, p-t-butylphenylsalicylate, and p-octylphenylsalicylate.

Examples of the cyanoacrylate-based compounds are 2-ethylhexyl-2-cyano-3,3'diphenylacrylate, and ethyl-2-cyano-3,3'-diphenylacrylate.

Examples of the oxalic acid anilide-based compounds such as 2-ethoxy-2'-ethyle-oxalic acid bisanilide.

The ultraviolet absorber is added in an amount of 0.1 percent by weight or more and preferably 1 percent by weight or more in the ion conductive layer. The upper limit is 20 percent by weight and preferably 10 percent by weight.

The electrochromic device of the present invention may be produced by any suitable method. For instance, in the case where the ion conductive substance is liquid type or gelatinized liquid type, the EC device of the present invention may be produced by injecting an ion conductive substance having the EC polymer dispersed therein into a space between two electrically conductive substrates disposed so as to oppose to each other and having sealed peripheral edges, by vacuum injection or atmospheric injection or a meniscus method and then sealing the peripheral edges.

Alternatively, depending on the type of ion conductive substance, the EC device of the present invention may be produced by forming an ion conductive layer containing the EC polymer over one of the two electrically conductive substrates and then superimposing the other substrate thereover. Further alternatively, the EC device may be produced just like producing a laminated glass using the ion conducive substance containing the EC polymer formed into a film.

In the case of using the solid ion conductive substance, particularly a polymeric solid electrolyte containing a urethaneacrylate or a modified alkylene oxide, the EC device of the present invention may be prepared by injecting an unsolidified polymeric solid electrolyte precursor containing the EC polymer (A) into a space between two electrically conductive substrates disposed so as to oppose to each other and having sealed peripheral edges, by vacuum injection or atmospheric injection or a meniscus method and curing the electrolyte with a suitable means after sealing the injection port.

The ion conductive layer of the electrochromic device according to the present invention has an ion conductivity of usually $1 \times 10^{-7}$ S/cm or greater, preferably $1 \times 10^{-6}$ S/cm or greater, and more preferably $1 \times 10^{-5}$ S/cm or greater, at room temperature. The thickness of the ion conductive layer is usually 1 µm or greater, preferably 10 µm or greater and 3 mm or less and preferably to 1 mm or less.

The basic structure of the EC device of the present invention will be described with reference to the drawings.

The electrochromic device shown in FIG. 1 has such a structure that an ion conductive layer 3 in which the EC polymer is dispersed is sandwiched between a transparent electrically conductive substance having a transparent substrate 1 and a transparent electrode layer 2 laminated thereover and an electrically conductive substrate having a transparent or opaque substrate 5 and a transparent, opaque or reflective electrode layer 4.

Figure 2:
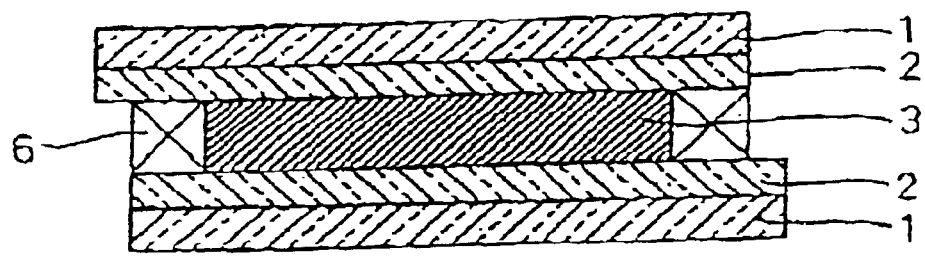
FIG. 2 is a cross-sectional view showing one example of the structure of an electrochromic smart window of the present invention.

FIG. 2 shows the structure of a display or a smart window which has an ion conductive layer 3 in which the EC polymer is dispersed, sandwiched in a space suitably provided between two transparent electrically conductive substrates each having a transparent electrode layer 2 formed on one surface of each transparent substrate 1 arranged so as to oppose to each other such that the transparent electrode layers face each other.

Figure 3:
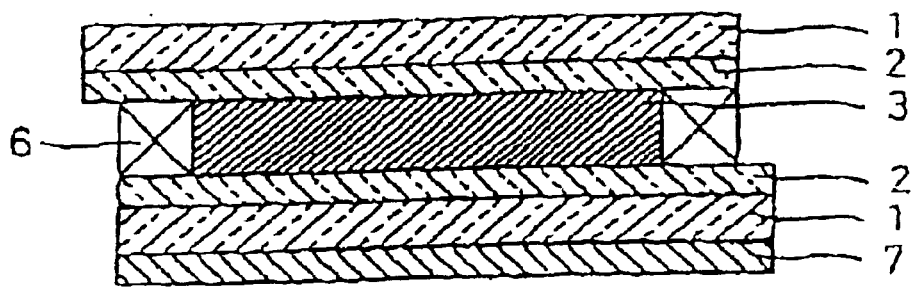
FIG. 3 is a cross-sectional view showing one example of the structure of an electrochromic mirror window of the present invention.

FIG. 3 shows the structure of an electrochromic mirror which has an ion conductive layer 3 in which the EC polymer is dispersed, sandwiched in a space suitably provided between a transparent electrically conductive substrate having a transparent electrode layer 2 on one surface of a transparent substrate 1 and a reflective electrically conductive substrate having a transparent electrode layer 2 on one surface of a transparent substrate 1 and a reflective layer 7 on the other surface thereof.

The EC devices shown in FIGS. 1 through 3 may be produced by any suitable method. For example, in the case of the device shown in FIG. 1, Laminate A is prepared by forming a transparent electrode layer 2 over a transparent substrate 1 by the above-mentioned method. Separately from this, Laminate B is prepared by forming a transparent, opaque, or reflective electrode layer 4 over on a substrate 5. An empty cell with an injection port is formed by disposing Laminates A and B so as to oppose to each other with a space of 1 to 1,000 µm and then sealing the peripheral edges with a sealant 6 except a portion for the port. An ion conductive layer 3 is formed by injecting an ion conductive substance into the cell by the above-mentioned method and then curing the substance thereby producing an EC device.

A spacer may be used in order to keep the space between Laminates A and B constant upon placing them in an opposing relationship. The spacer may be in the form of beads or sheet formed from glass or polymer. The spacer may be provided by inserting the beads or sheet into the space between the substrates facing each other or by forming protrusions formed from an insulate material such as resin, over the electrode of the electrically conductive substrate.

Alternatively, Laminate A' is prepared by forming a transparent electrode layer 2 and an ion conductive layer 3 on a transparent substrate in this order by the above-mentioned method. Separately form this, Laminate B' is prepared by a transparent, opaque or reflective electrode layer 4 over on a substrate 5 electrode layer 4 over a substrate 5 by the above-mentioned method. Laminates A' and B' are disposed in an opposed relation with a space of 1 to 1,000 μm such that the ion conductive layer contacts the transparent, opaque or reflective electrode layer. The EC device is then produced by sealing the peripheral edges of the laminates with a sealant 6.

In the case of a smart window shown in FIG. 2, two transparent electrically conductive substrates are prepared by forming a transparent electrode layer 2 over one surface of a transparent substrate 1. After this, the smart window is produced by following the same procedures as those described with respect to the device shown in FIG. 1. The EC mirror shown in FIG. 3 may be produced by following the same procedures as those described with respect to the device shown in FIG. 1 after forming a transparent electrically conductive substrate prepared by forming a transparent electrode layer 2 over a transparent substrate 1 and a reflective electrically conductive substrate prepared by forming a transparent electrode layer on one surface of a transparent substrate 1 and a reflective layer 7 on the other surface.

FIGS. 1 through 3 show typical examples of the structures of the EC device of the present invention. If necessary, ultraviolet shielding layers for reflecting or absorbing ultraviolet radiation may be added. An EC mirror may additionally have an overcoat layer for protecting the surface the entire mirror layer or each layer. The ultraviolet shielding layer may be arranged on either the outer surface or transparent electrode surface of the transparent substrate 1. The overcoat layer may be arranged on either the outer surface of the transparent substrate 1 or the reflective layer 7.

Applicability in the Industry

The EC device of the present invention has lower leakage current and can color with a lower concentration electrochromic substance than the conventional devices, using a specific electrochromic polymer. The EC device can reduce the remnant coloration upon decoloration after long time coloration.

The EC device of the present invention can be used suitably for display devices, smart windows, anti-glare mirrors for automobiles, and electrochromic mirrors such as decorative mirrors placed outdoor.

BEST MODE FOR CARRYING OUT THE INVENTION

The present invention will now be described with reference to the following examples but not limited thereto.

EXAMPLE 1

An epoxy sealant containing glass beads of about 130 μm was applied in the form of lines along the peripheral edges of a transparent glass substrate of 10 cm square coated with ITO, except for a portion to be used for injecting a solution. Over this substrate, another ITO-coated transparent glass substrate was superposed such that their ITO surfaces face each other and then the epoxy sealant was cured with pressurizing thereby producing a hallow cell with an injection port. The cell gap of the resulting cell was about 125 μm.

On the other hand, a mixed solution was prepared by mixing 3 g of methoxypolyethylene glycol monomethacrylate (the number of oxyethylene unit: 4) manufactured by SHIN NAKAMURA CHEMICAL CO. LTD. under the trade name of M40G, 0.5 g of a monomer of formula (32) having in the side chain an isocyanate group, 5 g of γ-butylolactone, and 0.01 g of azobisbutylonitrile and cooled with ice. 15 g of γ-butylolactone was heated to a temperature of 80° C. in another vessel and the mixed solution was added thereto with a micro pump over 30 minutes. Thereafter, the mixture was heated at a temperature of 80° C. for another 3 hours thereby obtaining a solution of a copolymer. The resulting copolymer had a weight-average molecular weight of 30,000.

To the copolymer solution was added 1 g of an electrochromic compound having a hydroxyl group represented by formula (33) and 0.01 g of dibutyl tin dilaurate. The mixture was reacted at a temperature of 100° C. for 5 hours thereby obtaining an electrochromic polymer solution. It was confirmed with NMR and IR that all the hydroxyl groups were reacted with the isocyanate groups of the polymer.

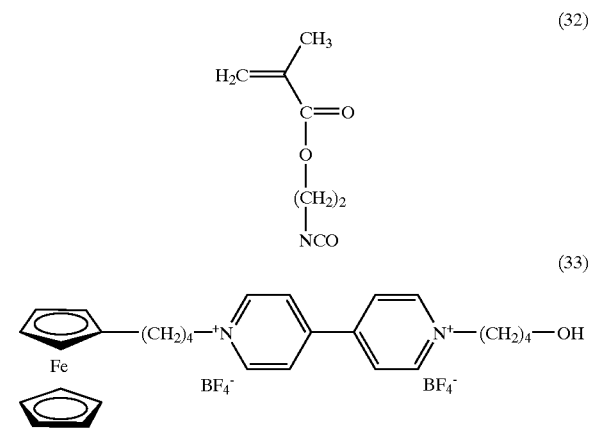

To the electrochromic polymer solution obtained above was added 0.03 g of 2-(5-methyl-2-hydroxyphenyl) benzotriazole manufactured by CIBA-GEIGY under the trade name of TINUVIN P and further added tetrafluoroboric acid tetrabutylammonium such that the concentration thereof was made to 0.5 M, thereby obtaining a homogeneous solution. The concentration of the structure originating from the compound (33) in this solution was about 60 mM.

The homogeneous solution was deaerated and then injected into the cell obtained above through the injection port.

The injection port was sealed with an epoxy sealant thereby obtaining an electrochromic smart window with a structure as shown in FIG. 1.

The smart window when assembled was not colored and had a transmittancy of about 85%. The smart window was quick in response to the application of an electric voltage and exhibited excellent electrochromic properties. The smart window was colored upon application of a voltage of 1.1 V and had about 15% transmittancy of 633 nm wavelength light. The leakage current thereupon was about 10 mA. Coloring and decoloring operations were repeated every 10 seconds, but no remnant coloration was observed even after the lapse of about 200 hours.

EXAMPLE 2

An epoxy sealant containing glass beads of about 60 μm was applied in the form of lines along the peripheral edges of a transparent glass substrate of 10 cm square coated with ITO, except for a portion to be used for injecting a solution. Over this substrate, another ITO-coated transparent glass substrate was superposed such that their ITO surfaces face each other and then the epoxy sealant was cured with pressurizing thereby producing a hallow cell with an injection port. The cell gap of the resulting cell was about 55 μm.

On the other hand, similarly to the procedures of Example 1, a copolymer solution was obtained by polymerizing 4 g of methoxypolyethylene glycol monomethacrylate (the number of oxyethylene unit: 4) manufactured by SHIN NAKAMURA CHEMICAL CO. LTD. under the trade name of M40G and 1 g of a monomer of formula (34) having in the side chain a hydroxyl group using 20 g of γ-butylolactone as a solvent. The weight-average molecular weight of the resulting polymer was about 20,000.

To the copolymer solution was added 1 g of an electrochromic compound having a carboxyl group represented by formula (35) and further added 0.01 g of p-toluene sulfonic acid as a catalyst. The mixture was reacted at a temperature of 100° C. for 10 hours while removing the water thus produced thereby obtaining an electrochromic polymer solution. It was confirmed with NMR and IR that all the carboxyl groups were reacted with the hydroxyl groups of the polymer.

a homogeneous solution. The concentration of the structure originating from the compound (35) in this solution was about 50 mM.

The homogeneous solution was deaerated and then injected into the cell obtained above through the injection port.

After the injection port was sealed with an epoxy sealant, the solution in the cell was cured by exposing both the surfaces of the cell to fluorescent light thereby obtaining an electrochromic smart window with the structure shown in FIG. 1.

The smart window when assembled was not colored and had a transmittancy of about 85%. The smart window was quick in response to the application of an electric voltage and exhibited excellent electrochromic properties. The smart window was colored upon application of a voltage of 1.1 V and had about 15% transmittancy of 633 nm wavelength light. The leakage current thereupon was about 5 mA. Coloring and decoloring operations were repeated every 10 seconds, but no remnant coloration was observed even after the lapse of about 200 hours. No significant remnant coloration was observed upon decoloration after coloration was continued for one hour with a voltage of 1.1 V.

EXAMPLE 3

A laminate was prepared by forming a thin film of palladium as a highly reflective electrode, over a substrate. An epoxy sealant containing glass beads of about 60 μm was applied in the form of lines along the peripheral edges, except for a portion to be used for injecting an electrolyte precursor solution, of the palladium film layer of the laminate. A transparent glass substrate coated with $SnO_2$ was superposed over the laminate such that the $SnO_2$ surface and

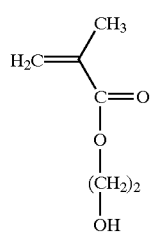

(34)

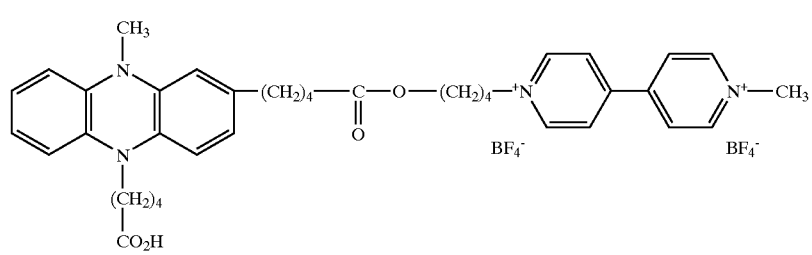

(35)

To the electrochromic polymer solution was added a mixed solution of 0.2 of polyethylene glycol dimethacrylate (the number of oxyethylene unit: 9) manufactured by SHIN NAKAMURA CHEMICAL CO. LTD. under the trade name of 9G, 0.01 g of 1-(4-isopropylphenyl)-2-hydroxy-2-methylpropane-1-on, and 0.5 g of 2-(2'-hydroxy-5'-t-butylphenyl)benzotriazole. To the mixture was further added tetrafluoroboric acid trimethylethylammonium such that the concentration thereof was made to 0.5 M thereby obtaining the palladium film layer face each other and then the epoxy sealant was cured with pressurizing thereby forming a hallow cell with an injection port. The cell gap of the resulting cell was about 55 μm.

On the other hand, similarly to the procedures of Example 1, a copolymer solution was obtained by polymerizing 4 g of methoxypolyethylene glycol monomethacrylate (the number of oxyethylene unit: 9) manufactured by SHIN NAKAMURA CHEMICAL CO. LTD. under the trade name of M90G and 1 g of a monomer of formula (36) having in the side chain an epoxy group using 20 g of γ-butylolactone as a solvent. The weight-average molecular weight of the resulting polymer was about 30,000.

To the copolymer solution was added 1 g of an electrochromic compound having a hydroxyl group represented by formula (37) and further added 0.005 g of 2-n-undecylimidazole thereby obtaining a homogeneous solution. The solution was reacted at a temperature of 100° C. for 10 hours thereby obtaining an electrochromic polymer solution. It was confirmed with NMR and IR that all the hydroxyl groups were reacted with the epoxy groups of the polymer.

window was colored upon application of a voltage of 1.1 V and had about 18% transmittancy of 633 nm wavelength light. The leakage current thereupon was about 7 mA. Coloring and decoloring operations were repeated every 10 seconds, but no remnant coloration was observed even after the lapse of about 200 hours. No significant remnant coloration was observed upon decoloration after coloration was continued for one hour with a voltage of 1.1 V.

EXAMPLE 4

A laminate was prepared by forming a thin film of palladium as a highly reflective electrode, over a substrate. An epoxy sealant containing glass beads of about 60 μm was applied in the form of lines along the peripheral edges,

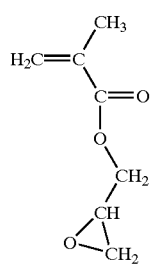

(36)

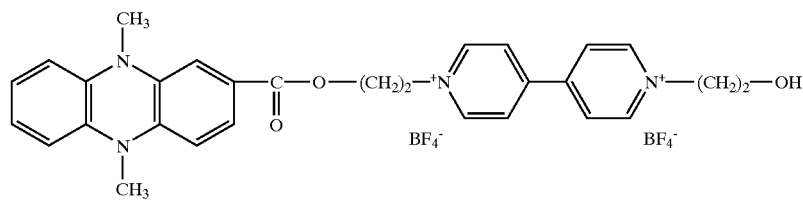

(37)

To the electrochromic polymer solution was added a mixed solution of 1.0 of methoxypolyethylene glycol monomethacrylate (the number of oxyethylene unit: 4) manufactured by SHIN NAKAMURA CHEMICAL CO. LTD. under the trade name of M40G, 0.1 g of trimethylolpropane trimethacrylate manufactured by SHIN NAKAMURA CHEMICAL CO. LTD. under the trade name of TMPT, 0.02 g of 1-(4-isopropylphenyl)-2-hydroxy-2-methylpropane-1-on, and 0.2 g of 2-(5-methyl-2-hydroxyphenyl)benzotriazole manufactured by CIBA-GEIGY under the trade name of TINUVIN P. To the mixture was further added tetrafluoroboric acid tetraethylammonium such that the concentration thereof was made to 0.5 M thereby obtaining a homogeneous solution. The concentration of the structure originating from the compound (37) in this solution was about 60 mM.

The homogeneous solution was deaerated and then injected into the cell obtained above through the injection port.

After the injection port was sealed with an epoxy sealant, the solution in the cell was cured by exposing both the surfaces of the cell to fluorescent light thereby obtaining an electrochromic smart window with the structure shown in FIG. 1.

The smart window when assembled was not colored and had a transmittancy of about 85%. The smart window was quick in response to the application of an electric voltage and exhibited excellent electrochromic properties. The smart except for a portion to be used for injecting an electrolyte precursor solution, of the palladium film layer of the laminate. A transparent glass substrate coated with $SnO_2$ was superposed over the laminate such that the $SnO_2$ surface and the palladium film layer face each other and then the epoxy sealant was cured with pressurizing thereby forming a hallow cell with an injection port. The cell gap of the resulting cell was about 55 μm.

On the other hand, similarly to the procedures of Example 1, a copolymer solution was obtained by polymerizing 4 g of methoxypoly-ethylene glycol monomethacrylate (the number of oxyethylene unit: 4) manufactured by SHIN NAKAMURA CHEMICAL CO. LTD. under the trade name of M40GN and 1 g of a monomer of formula (38) having in the side chain a carboxyl group using 20 g of γ-butylolactone as a solvent. The weight-average molecular weight of the resulting polymer was about 10,000.

To the copolymer solution was added 1 g of an electrochromic compound having an epoxy group represented by formula (39) and further added 0.005 g of 2-n-undecylimidazole thereby obtaining a homogeneous solution . The solution was reacted at a temperature of 100° C. for 10 hours thereby obtaining an electrochromic polymer solution. It was confirmed with NMR and IR that all the epoxy groups were reacted with the carboxyl groups of the polymer.

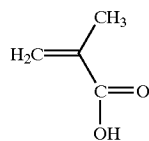

(38)

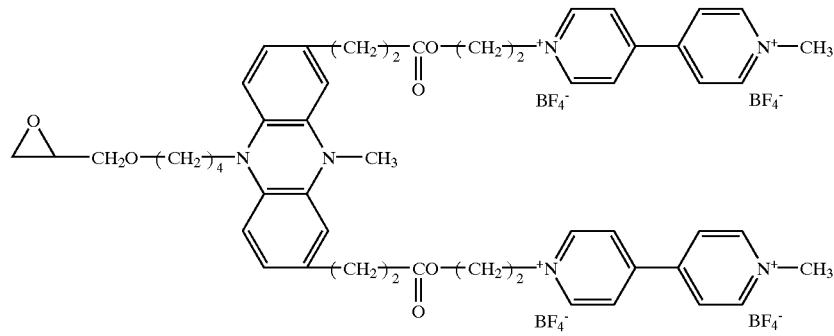

(39)

To the electrochromic polymer solution was added a mixed solution of 1.0 of methoxypolyethylene glycol monomethacrylate (the number of oxyethylene unit: 4) manufactured by SHIN NAKAMURA CHEMICAL CO. LTD. under the trade name of M40G, 0.1 g of polyethylene glycol dimethacrylate (the number of oxyethylene unit: 9) manufactured by SHIN NAKAMURA CHEMICAL CO. LTD. under the trade name of 9G, 0.02 g of 1-(4-isopropylphenyl)-2-hydroxy-2-methylpropane-1-on, and 0.2 g of 2-(2'-hydroxy-5'-t-butylphenyl). To the mixture was further added lithium perchlorate such that the concentration thereof was made to 0.8 M thereby obtaining a homogeneous solution. The concentration of the structure originating from the compound (39) in this solution was about 30 mM.

The homogeneous solution was deaerated and then injected into the cell obtained above through the injection port.

After the injection port was sealed with an epoxy sealant, the solution in the cell was cured by exposing both the surfaces of the cell to fluorescent light thereby obtaining an electrochromic smart window with the structure shown in FIG. 1.

The smart window when assembled was not colored and had a transmittancy of about 85%. The smart window was quick in response to the application of an electric voltage and exhibited excellent electrochromic properties. The smart window was colored upon application of a voltage of 1.1 V and had about 25% transmittancy of 633 nm wavelength light. The leakage current thereupon was about 8 mA. Coloring and decoloring operations were repeated every 10 seconds, but no remnant coloration was observed even after the lapse of about 200 hours. No significant remnant coloration was observed upon decoloration after coloration was continued for one hour with a voltage of 1.1 V.

Comparative Example 1

An epoxy sealant containing glass beads of about 60 μm was applied in the form of lines along the peripheral edges of a transparent glass substrate of 10 cm square coated with ITO, except for a portion to be used for injecting a solution. Over this substrate, another ITO-coated transparent glass substrate was superposed such that their ITO surfaces face each other and then the epoxy sealant was cured with pressurizing thereby producing a hallow cell with an injection port. The cell gap of the resulting cell was about 55 μm.

An electrochromic compound represented by formula (40) wherein Ph is phenyl group, ferrocene, and tetrafluoroboric acid trimethylethylammonium were added to a mixed solution of 25 g of γ-butylolactone and 0.2 g of 2-(2'-hydroxy-5'-t-butylphenyl)benzotriazole such that the concentration of the compound of formula (40) and ferrocene was made to 0.5 M, respectively and the concentration of the tetrafluoroboric acid trimethylethylammonium was made to 0.5M thereby obtaining a homogeneous solution.

The homogeneous solution was deaerated and then injected into the cell obtained above through the injection port.

After the injection port was sealed with an epoxy sealant, the solution in the cell was cured by exposing both the surfaces of the cell to fluorescent light thereby obtaining an electrochromic smart window with the structure shown in FIG. 1.

The smart window when assembled was not colored and had a transmittancy of about 85%. The smart window had about only 30% transmittancy of 633 nm wavelength light. The leakage current thereupon was about 20 mA. Coloring and decoloring operations were repeated every 10 seconds, but no remnant coloration was observed even after the lapse of about 200 hours. Remnant coloration was observed at the anode side upon decoloration after coloration was continued for one hour with a voltage of 1.1 V.

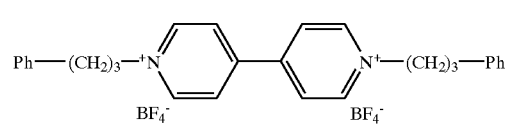

(40)

What is claimed is:

1. An electrochromic device having an ion conductive layer between a pair of electrically conductive substrates at least one of which is transparent
    wherein said ion conductive layer contains an electrochromic polymer which is a reaction product of a polymer having reactive groups and an organic compound having both a structure exhibiting cathodic electrochromic properties and a structure exhibiting anodic electrochromic properties and functional groups reactive to said reactive groups and wherein said structure exhibiting cathodic electrochromic properties is a bipyridinium ion pair structure represented by formula (1) below and said structure exhibiting anodic electrochromic properties is a metallocene structure represented by formula (2) or (3) below:

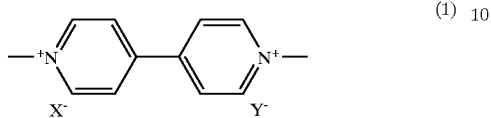
(1)

wherein $X^-$ and $Y^-$ are the same or different and are each independently a pair-anion selected from the group consisting of a halogen anion, $ClO_4^-$, $BF_4^-$, $PF_6^-$, $CHCOO^-$, and $CH_3(C_6H_4)SO^-$; and

(2)

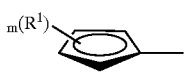
(3)

wherein $R^1$ and $R^2$ are the same or different and are each independently a hydrocarbon group selected from the group consisting of an alkyl group, an alkenyl group and an aryl group having 1 to 10 carbon atoms, in the case where $R^1$ or $R^2$ is an aryl group, the aryl group may form a condensed ring together with a cyclopentadienyl ring, m is an integer of $0 \leq m \leq 4$, n is an integer of $0 \leq n \leq 4$, and Me represents Cr, Co, Fe, Mg, Ni, Os, Ru, V, X—HF—Y, X—Mo—Y, X—Nb—Y, X—Ti—Y, X—V—Y or X—Zr—Y wherein X and Y are each independently selected from the group consisting of hydrogen, a halogen group and an alkyl group having 1 to 12 carbon atoms.

2. An electrochromic device having an ion conductive layer between a pair of electrically conductive substrates at least one of which is transparent wherein said ion conductive layer contains an electrochromic polymer which is a reaction product of a polymer having reactive groups and an organic compound having both a structure exhibiting cathodic electrochromic properties and a structure exhibiting anodic electrochromic properties and functional groups reactive to said reactive groups and wherein said structure exhibiting cathodic electrochromic properties is a bipyridinium ion pair structure represented by formula (1) below and said structure exhibiting anodic electrochromic properties is a dihydrophenazine structure represented by one of formulae (4) through (7) below:

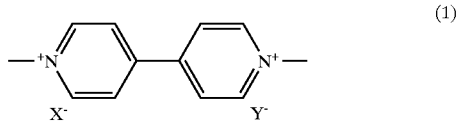
(1)

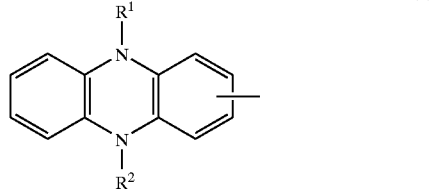
(4)

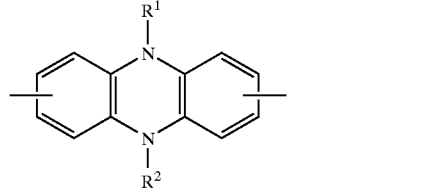
(5)

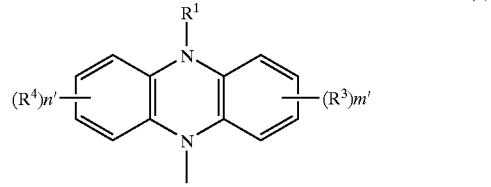
(6)

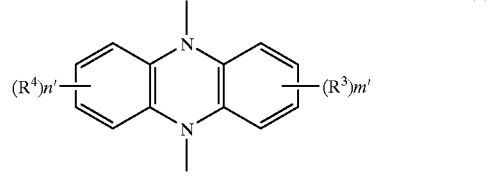
(7)

wherein $R^1$ and $R^2$ are the same or different and are each independently a hydrocarbon group selected from the group consisting of an alkyl group, an alkenyl group and an aryl group having 1 to 10 carbon atoms, in the case where $R^1$ or $R^2$ is an aryl group, the aryl group may form a condensed ring together with a cyclopentadienyl ring, and wherein $R^3$ and $R^4$ are the same or different and are each independently a hydrocarbon group selected from the group consisting of an alkyl group, an alkenyl group, and an aryl group having 1 to 10 carbon atoms, where m' is an integer of $0 \leq m' \leq 4$, and n' is an integer of $0 \leq n' \leq 4$.

* * * * *